United States Patent [19]

Falkenbach

[11] 4,297,038
[45] Oct. 27, 1981

[54] ELECTRIC BLENDER

[75] Inventor: Guenther Falkenbach, Eschborn, Fed. Rep. of Germany

[73] Assignee: Braun AG, Kronberg, Fed. Rep. of Germany

[21] Appl. No.: 88,917

[22] Filed: Oct. 29, 1979

[30] Foreign Application Priority Data

Apr. 19, 1978 [DE] Fed. Rep. of Germany ....... 2817044

[51] Int. Cl.³ ............................................... B01F 7/16
[52] U.S. Cl. ................................. 366/206; 241/282.1; 366/204; 366/205; 366/314; 366/347; 366/601
[58] Field of Search .................. 366/197, 204–206, 366/279, 293, 314, 347, 349, 601; 241/282.1, 282.2, 199.2

[56] References Cited

U.S. PATENT DOCUMENTS 3,786,999  1/1974  Cabell ................................. 366/205

FOREIGN PATENT DOCUMENTS 2228189  1/1973  Fed. Rep. of Germany ... 241/282.1

Primary Examiner—Harvey C. Hornsby
Assistant Examiner—Timothy F. Simone
Attorney, Agent, or Firm—Sughrue, Mion, Zinn, Macpeak and Seas

[57] ABSTRACT

An electric household blender which effectively disables a person from placing his hand in the container while the blades are still rotating. The electric blender includes a container holder 2 and a motor base 4 having associated guide surfaces, a lock ring 9 rotatably mounted within said motor base, and lock bolts 8 arranged on the lock ring so as to protrude through openings 13 in the motor base housing. The lock bolts cooperate with pins 7 arranged on the container holder so as to align the lock bars with lock bolt supports 12 arranged in the container holder. The blender further includes a lock bar 11 which has a stud on one end and which defines a recess 29. The stud is adapted to cooperate with the lock ring for the rotation thereof, and the recess is adapted to selectively block or allow movement of a lock rod 26 equipped with a shoulder, which prevents rotation of said electric operating switch when the above locking elements are in their unlocked positions.

7 Claims, 7 Drawing Figures

ELECTRIC BLENDER

BACKGROUND OF THE INVENTION

The invention relates to an electric household blender having a removable container, in which motor-driven winged blades rotate and having a motor base with an electric operating switch.

In known apparatus of this type it often occurs, particularly when a low-density material is to be processed in the container, that the rotor of the motor continues to rotate for several seconds after being turned off. If the user is not careful there is a danger of severe injury if the user places his hand into the container before the blades have completely stopped rotating.

In order to protect the user of a household blender from this type of injury, it has already been proposed in German Pat. No. 2,228,189 to close the control circuit of a brake device of the motor as soon as the lid is removed from the container. For this purpose the electrical circuit of the drive motor includes one or more switches connected in series, whose movable switch element can assume either an operating position in which the electrical circuit is closed, or a rest position in which this electrical circuit is open. The movable switch element of at least one switch has at least one contact, which, when in the rest position, closes the control circuit of the brake device of the motor. Turning the blender on by moving the switch out of the brake position is effected by pressing the lid against the container. This known household blender has the disadvantage that the user must continually press downward on the lid of the device and can thus not leave the device while it is in operation. Furthermore, the known household blender cannot be combined with auxiliary units, such as a mixing unit, citrus press or meat grinder, because these auxiliary units require a firm anchor to the motor base.

SUMMARY OF THE INVENTION

The objective of the present invention is to create an electric household blender, in which after the motor is turned off all danger of injury from still-rotating blades is eliminated and which allows the addition of auxiliary units. The apparatus is to be formed in such a manner that the user of the blender need not remain next to the apparatus during its operation.

This objective is achieved according to the invention in that the container is held by a container holder with lock bolt supports which can be placed on the motor base and which can be locked with lock bolts by means of a locking ring. For this purpose the locking ring—which is held and guided in the motor base, is rotatable about the longitudinal axis of the motor base and can be moved by a lock bolt cooperating with a lock rod which can be moved longitudinally in the motor base, and which in turn releases or locks the operating switch for turning the motor on and off, depending on the position of the locking ring.

The motor base and container holder are advantageously provided with guide surfaces, whereby the container holder has lock openings or slots in the vicinity of the guide surfaces as lock bolt supports, in which lock bolts or studs engage. These lock bolts or studs are arranged on the movable lock ring and are supported and guided in openings in the housing of the motor base.

The container holder is advantageously provided with guide surfaces, at least two of which are arranged so as to be distributed about the circumferential surface, whereby each locking pocket is provided with a locking groove or locking slot and the locking pockets are enclosed in corresponding depressions equipped with guide surfaces, which are provided on the motor base.

The measures according to the invention assure that the apparatus can be turned on only when the container for the material to be blended or an auxiliary unit is placed on the motor base and is rigidly locked thereto. The unlocking procedure and subsequent removal of the container holder requires sufficient time to ensure that the motor will have stopped before contact with the tools or blades is possible.

BRIEF DESCRIPTION OF THE DRAWINGS

The invention allows a wide variety of possible embodiments. One of these is schematically illustrated in the attached drawings, wherein.

DETAILED DESCRIPTION OF THE PREFERRED EMBODIMENT

Figure 4:
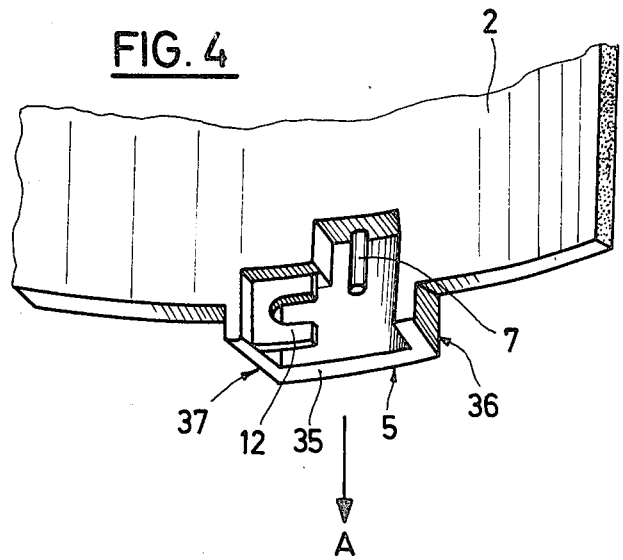
FIG. 4 shows a perspective partial illustration of the container holder with interlocking pocket.

The container 1, together with the lid 10, is held by a holder 2 between the edge 20 of the holder 2 on one side and the motor base 4 on the other side. In order to lock the container to the motor base 4, the holder 2 has three interlocking pockets 5 with guide surfaces 35, 36, 37 uniformly distributed about its circumference. These guide surfaces are provided with respective perpendicular projections 7 and a lock bolt support 12 (FIG. 4). When the holder 2 is placed on the motor base 4 the projections 7 move in the direction of arrow A (FIG. 4) and press against the lock bolts 8, three of which are distributed about the circumference of a lock ring 9 arranged on the inside of the motor base, and thus make the interlocking mechanism (shown in FIGS. 6 and 7) capable of operation.

Figure 6:
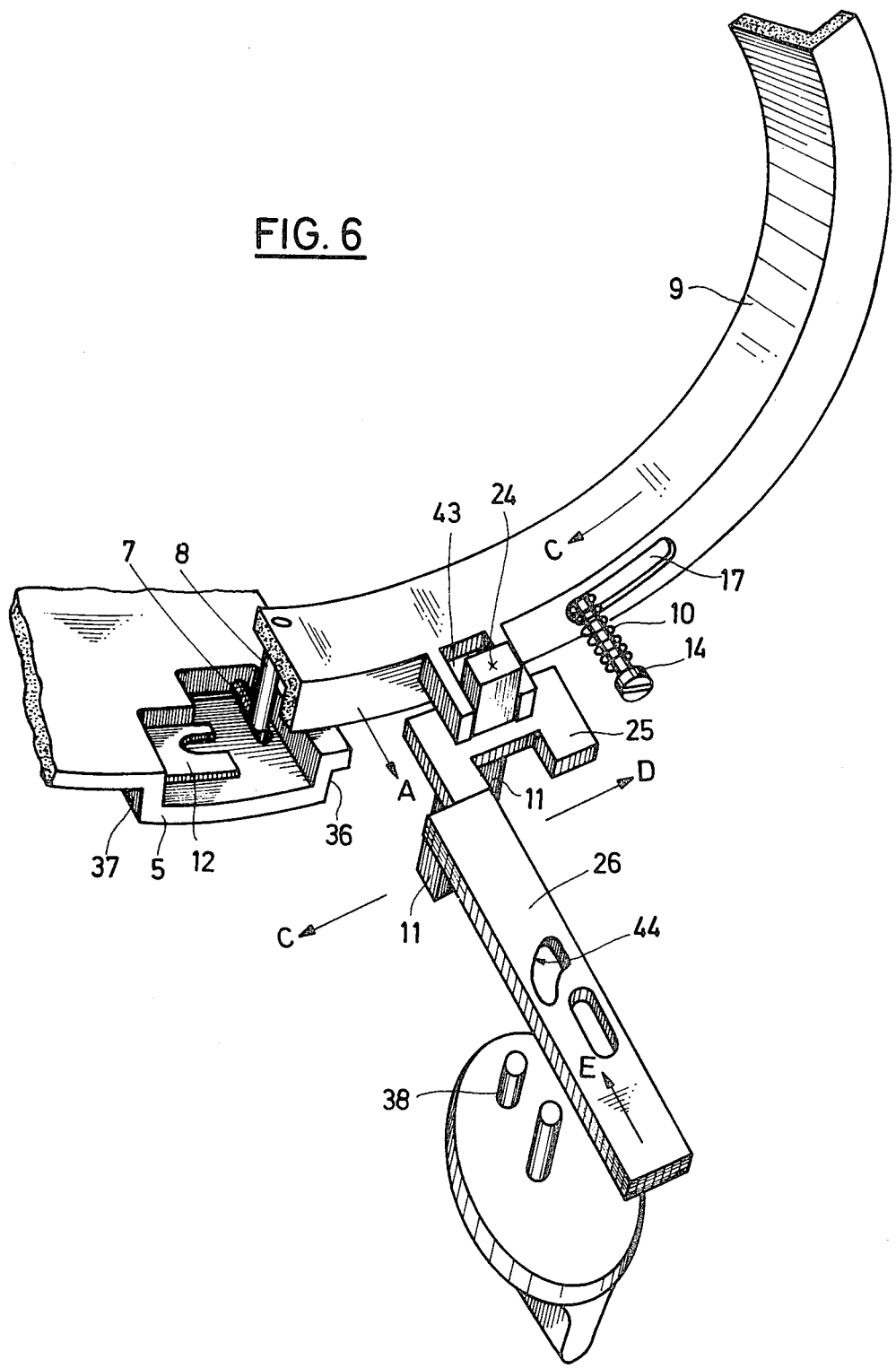
FIGS. 6 and 7 show a schematic and perspective illustration of the basic parts of the device for locking the container holder to the motor base.
Figure 7:
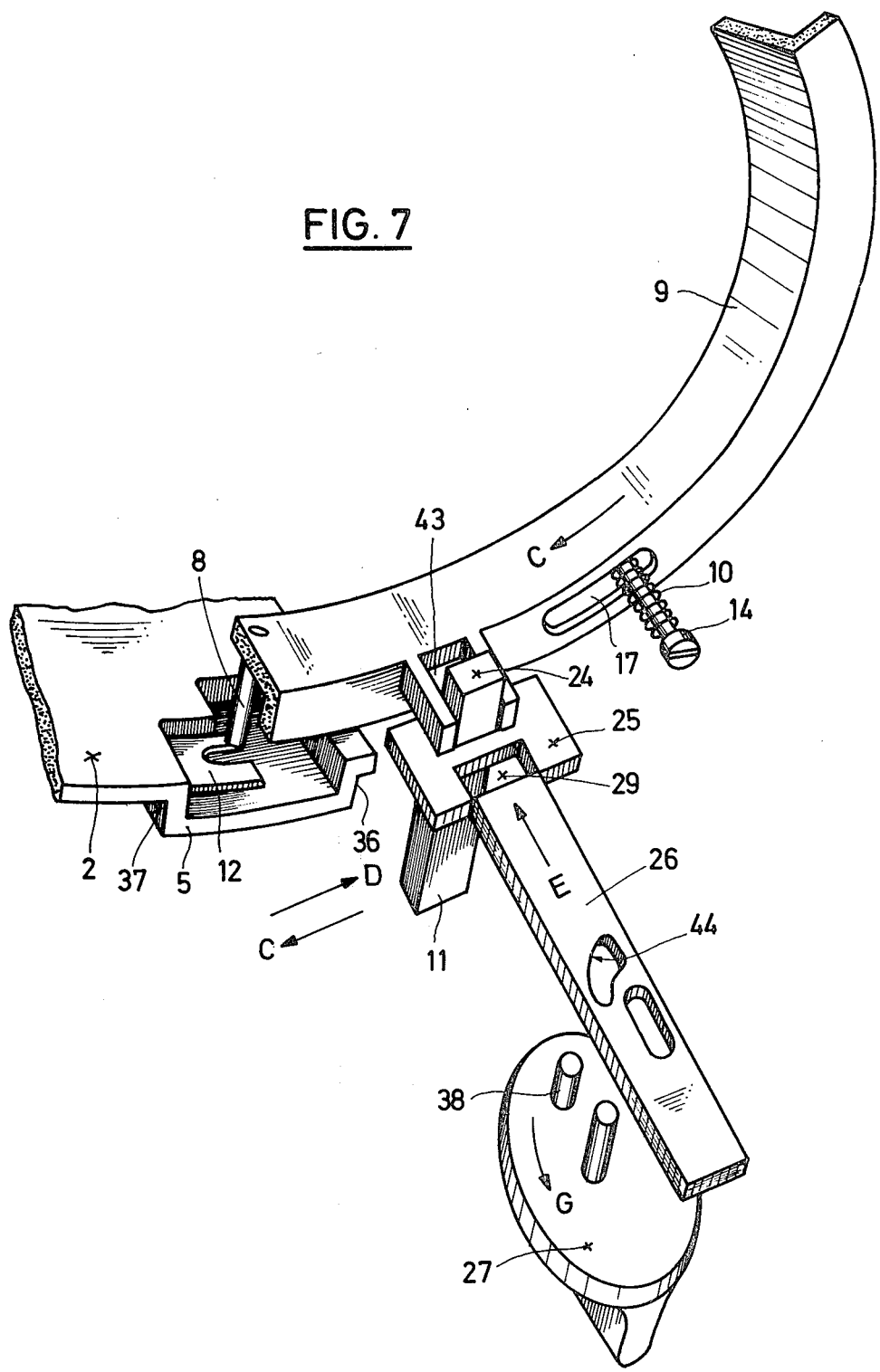

After mounting the holder 2 and moving it in the direction of arrow A, the lock ring 9, which is movably mounted in the motor base (FIG. 6) is pushed by the projections 7 against the force of springs. If the lock ring 9 is then rotated in the direction of arrow C by the lock bar 11 via the external projection of the latter on the outside of the motor housing, the lock bolt 8 moves into the lock bolt support 12 (FIG. 7). The horizontally arranged lock bolts 8 are held and guided for this purpose in long L-shaped openings 13 cut in the housing wall of the motor base 4. The lock ring 9 also has three longitudinal holes 17 distributed about its circumference, and screws 14 with springs 16 pass through each of these longitudinal holes, the screws being attached at 15 to the motor base 4. The springs 16 press the lock ring 9 upward opposite the direction of arrow A.

Figure 5:
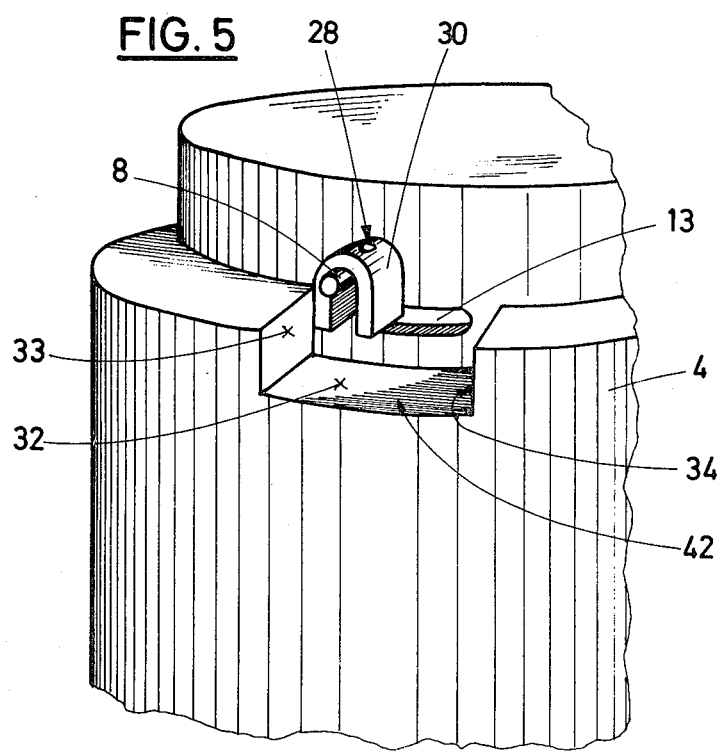
FIG. 5 shows a perspective partial illustration of the motor base.

On the outside wall of the motor base 4 in the area of the L-shaped longitudinal holes 13, downwardly open guide brackets 30 (FIG. 5) with bores 28 are provided for the projections 7, so that the projections of the interlocking pockets 5 exactly meet the lock bolts 8 of the lock ring 9 when the holder 2 is placed on the motor base. As shown in FIGS. 6 and 7, the lock ring 9 can be moved in the direction of arrows C or D with the aid of the lock bar 11, which is guided in a longitudinal hole, not shown in detail, in the housing wall of the motor base.

In addition to a carrier 24, which is enclosed in a fork 43 of the lock ring 9, the lock bar 11 also has a lock fork 25, which acts together with the lock rod 26, which can be moved perpendicularly thereto in the motor base 4, and which, in turn, is engaged by the stud 38 of the operating switch. When the lock ring is in the position shown in FIG. 7, i.e., when the holder 2 is locked by the bolts 8 and the lock bolt supports 12 after the lock bar 11 is moved in arrow direction C, the lock rod 26 can be moved vertically upward in the direction of arrow E by rotating the operating switch 27 in the direction of arrow G, so that the lock rod 26 enters into the recess 29 of the lock fork 25. Only in this position (FIG. 7) can the operating switch 27 be rotated and the motor be turned on to drive the blades. If the operating switch 27 is rotated opposite the direction of arrow G, the lock rod 26 moves vertically downward opposite the direction of arrow E, so that the lock bar 11 can be moved in the direction of arrow D. After the lock bar is moved in the direction of arrow D (FIG. 6) the lock rod 26 is blocked, because one end thereof abuts the sides of the lock fork 25, which renders the operating switch 27 incapable of rotation.

Figure 1:
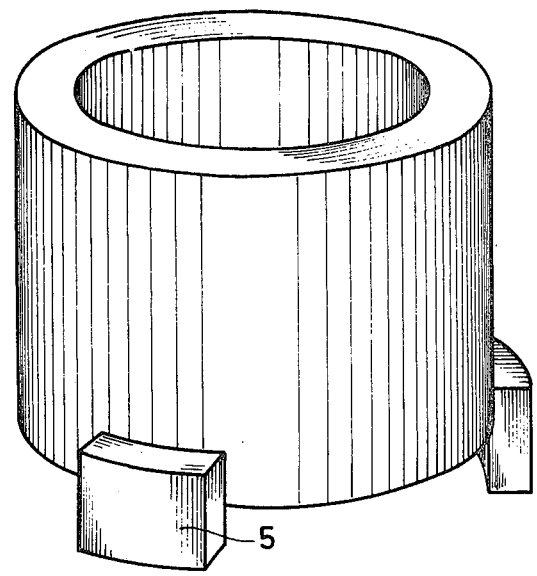
FIGS. 1 and 2 show an electric household blender in perspective view, with the holder for the container for receiving the material to be blended being separated from the motor base.
Figure 2:
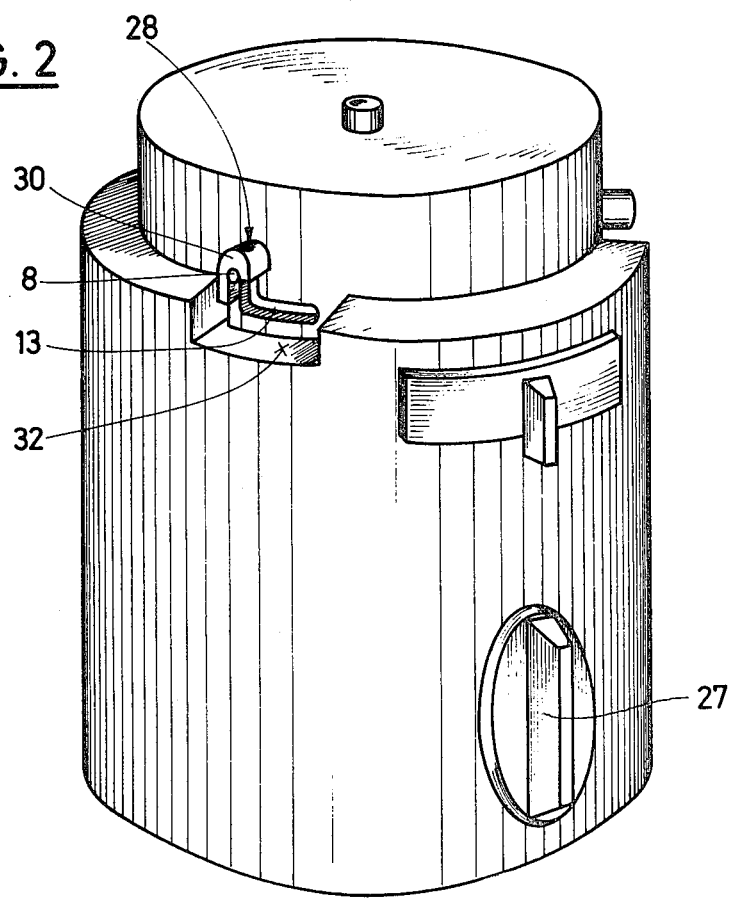
Figure 3:
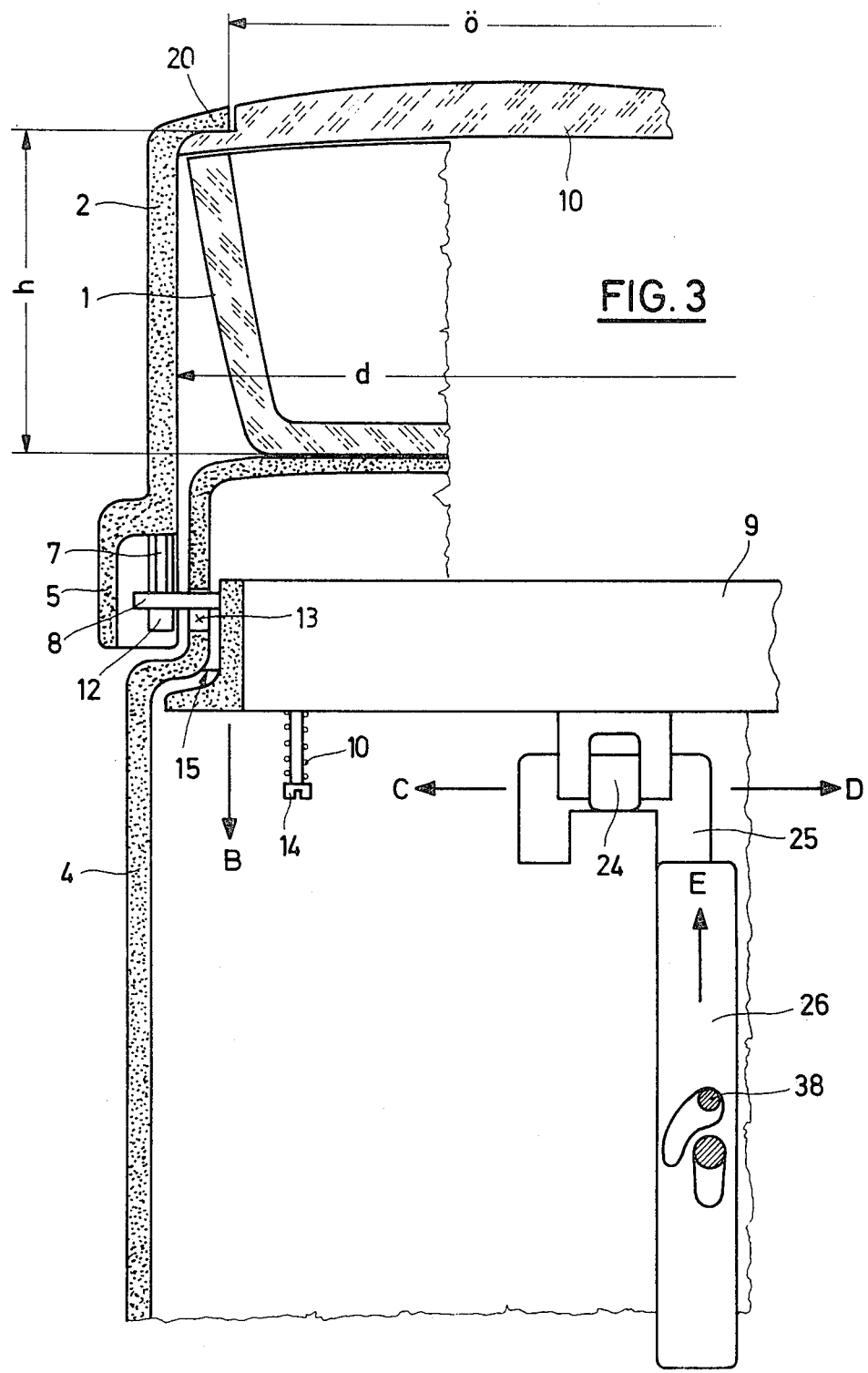
FIG. 3 shows a partial section through the blender, whereby the device for locking the container holder, part of the container and the container locked by the container holder are shown in section. The motor and wing blades are not depicted for better visibility.

The exemplary embodiment of the holder 2 shown in FIG. 3 is not only suited to hold a lid on a container and lock both parts (10 and 1) to the motor base 4, but rather the container 1 with lid 10 can be exchanged for a mixing unit, a meat grinder or a citrus press. These types of auxiliary units require only a base portion which corresponds in diameter d and height h (FIG. 3) to the illustrated container 1 and lid 10. Because the container holder 2 is provided on its upper side with an opening o, parts of the auxiliary units can be formed in such a manner that they project far beyond the holder 2. Finally, holders can be provided whose dimensions h and o are such that—for example with a mixing unit—it is impossible for the user to reach the rotating blades with the hand or fingers through the top opening. The inner surfaces of the container holder are effectively provided with ribs, cams of the like (not shown), which reliably prevent the container holder or the auxiliary unit from rotating about the blade axis when the motor is turned on. The electrical control portion in the motor base is also provided with a known braking device; thus when the motor is turned off the control circuit of a braking device is closed so that the motor instantaneously comes to a halt. Instead of an electrically operating braking device, the lock bar 26 can also be coupled with a mechanically operating motor brake. As soon as the lock bar moves in the opposite direction from arrow E—i.e. when the motor is turned off—it presses a brake shoe against the motor shaft.

What is claimed is:

1. An electric household blender including a motor base having a housing, an electric operating switch mounted in said motor base to turn on an electric motor, and a removable container which can be mounted on said motor base, comprising:
    (a) a container holder (2) adapted to be placed on said motor base;
    (b) a lock ring (9) mounted and guided in said motor base and capable of rotating about the longitudinal axis of said motor base;
    (c) lock bolts (8) arranged on said lock ring;
    (d) lock bolt supports (12) arranged on said container holder;
    (e) a lock bar (11) arranged to extend through an opening in said motor base and operable to engage with said lock ring in order to rotate said lock ring;
    (f) a lock rod (26) arranged within said motor base so as to be capable of longitudinal movement in the vertical direction of said motor base, said lock rod being operatively engaged with said switch, and cooperating with said lock ring in a manner such that said lock ring, when in a first position, locks said lock bar against longitudinal movement to prevent operation of said electric switch, and when in a second position, allows said electric switch to be selectively operated.

2. An electric household blender according to claim 1, further comprising:
    (a) guide surfaces on the motor base and on the container holder, said guide surfaces being associated with each other;
    (b) interlocking openings formed as lock bolt supports in the area of the guide surfaces, which openings accomodate said lock bolts and wherein said lock bolts are arranged on the movable lock ring; and
    (c) additional openings defined in said housing of said motor base in which said lock bolts are supported and guided.

3. An electric household blender according to claim 2, further comprising:
    (a) at least two interlocking pockets uniformly distributed about the circumference of said container holder, which pockets are provided with said guide surfaces, whereby each interlocking pocket is provided with an interlocking groove or slot, and;
    (b) depressions provided on the motor base, which depressions correspond to said interlocking pockets and are also provided with said guide surfaces, and wherein said interlocking pockets enter into said depressions.

4. An electric household blender according to claim 3, wherein said lock ring, which is capable of rotation about said motor base and can be moved perpendicularly to the plane of rotation, includes at least two said lock bolts and further comprising projections arranged on the container holder in the vicinity of said interlocking pockets near said lock bolt supports, whereby said lock bolts are disposed horizontally so as to come into contact with said projections when said container holder is mounted on said motor base to thus move said lock bolts on said lock ring into a position in front of said lock bolt supports.

5. An electric household blender according to claim 4, further comprising guide brackets on the motor base which define openings at their upper ends through which openings said projections pass, and wherein said openings in said housing for said lock bolts have an L shape and when in their unlocked position, said lock bolts bear against said projections arranged on said container holder.

6. An electric household blender according to claim 5, further comprising a stud arranged in said lock bar and wherein said lock ring defines a recess into which said lock bar stud enters, whereby said lock ring can be rotated by movement of said lock bar for the purpose of the locking or unlocking process.

7. An electric household blender according to claim 6, wherein said lock bar defines a recess into which one end of said lock rod enters when said lock ring is in the locked position, and further comprising a shoulder arranged on said lock rod and a stud arranged on said electric operating switch so as to cooperate with said shoulder and move said lock rod when said electric operating switch is turned.

* * * * *